United States Patent [19]
Pelton et al.

[11] Patent Number: 5,281,800
[45] Date of Patent: Jan. 25, 1994

[54] METHOD AND APPARATUS FOR LOW POWER OPTICAL SENSING AND DECODING OF DATA

[75] Inventors: Walter E. Pelton; David L. Emery, both of Charlotte, N.C.

[73] Assignee: Hand Held Products, Inc., Charlotte, N.C.

[21] Appl. No.: 812,769

[22] Filed: Dec. 23, 1991

[51] Int. Cl.$^5$ .............................................. G06K 7/10
[52] U.S. Cl. ................................................. 235/462
[58] Field of Search ........................ 235/462, 467, 472

[56] References Cited

U.S. PATENT DOCUMENTS

| | | | |
|---|---|---|---|
| 3,334,236 | 8/1967 | Bacon | 250/214 |
| 3,413,447 | 11/1968 | Mers . | |
| 3,418,456 | 12/1968 | Hamisch et al. | 250/255 |
| 3,456,117 | 7/1969 | Ritzert et al. | 250/569 |
| 3,474,234 | 10/1969 | Rieger et al. | 250/566 |
| 3,501,623 | 3/1970 | Robinson | 250/556 |
| 3,509,353 | 4/1970 | Sundblad et al. . | |
| 3,509,354 | 4/1970 | Reilly, Jr. . | |
| 3,585,366 | 6/1971 | Kern . | |
| 3,716,699 | 2/1973 | Eckert, Jr. et al. . | |
| 3,736,410 | 5/1973 | Ragland et al. . | |
| 3,784,483 | 7/1973 | England et al. | 250/219 D |
| 3,925,639 | 12/1975 | Hester | 235/463 |
| 3,946,241 | 3/1976 | Malinowski | 250/574 |
| 3,970,846 | 7/1976 | Schofield, Jr. et al. | 250/221 |
| 4,009,389 | 2/1977 | Lindholm | 250/221 |
| 4,072,859 | 2/1978 | McWaters | 250/214 |
| 4,160,156 | 7/1979 | Sherer | 235/463 |
| 4,240,064 | 12/1980 | DevChoudhury | 235/462 |
| 4,578,571 | 3/1986 | Williams | 235/469 |
| 4,694,182 | 9/1987 | Howard | 235/462 |
| 4,734,566 | 3/1988 | Senda et al. | 235/455 |
| 5,019,698 | 5/1991 | Eastman | 235/462 |

FOREIGN PATENT DOCUMENTS

| | | |
|---|---|---|
| 0424097A1 | 4/1991 | European Pat. Off. . |
| 433593A3 | 6/1991 | European Pat. Off. . |
| 62-137948 | 6/1987 | Japan . |
| 273182 | 11/1988 | Japan ................. 235/462 |
| 321583 | 12/1989 | Japan ................. 235/462 |
| 121076 | 5/1990 | Japan ................. 235/462 |
| 3-233692 | 10/1991 | Japan ................. 235/462 |

*Primary Examiner*—John Shepperd
*Attorney, Agent, or Firm*—Bell, Seltzer, Park & Gibson

[57] ABSTRACT

A portable optical data reader for optically sensing and decoding data, comprising a carrier oscillator for producing a carrier signal at a predetermined frequency, an optical emitter electrically connected to the carrier oscillator for emitting optical radiation in an optical path to an optical data carrier at the predetermined frequency, an optical detector for detecting the emitted optical radiation returning from the optical data carrier thereby receiving the optical data and producing a detected electrical signal responsive thereto, and a double balanced demodulator electrically connected to the optical detector and the carrier oscillator for combining the detected radiation signal with the carrier signal to demodulate the optical data with the optical data carrier.

A method of sensing and decoding optical data comprising-the steps of oscillating a carrier signal, transmitting the carrier signal to an optical emitter, thereby illuminating the optical emitter adjacent optical data, reflectively sensing the illumination from the optical emitter, thereby receiving the optical data, and demodulating the optical data by use of the oscillating carrier signal.

17 Claims, 5 Drawing Sheets

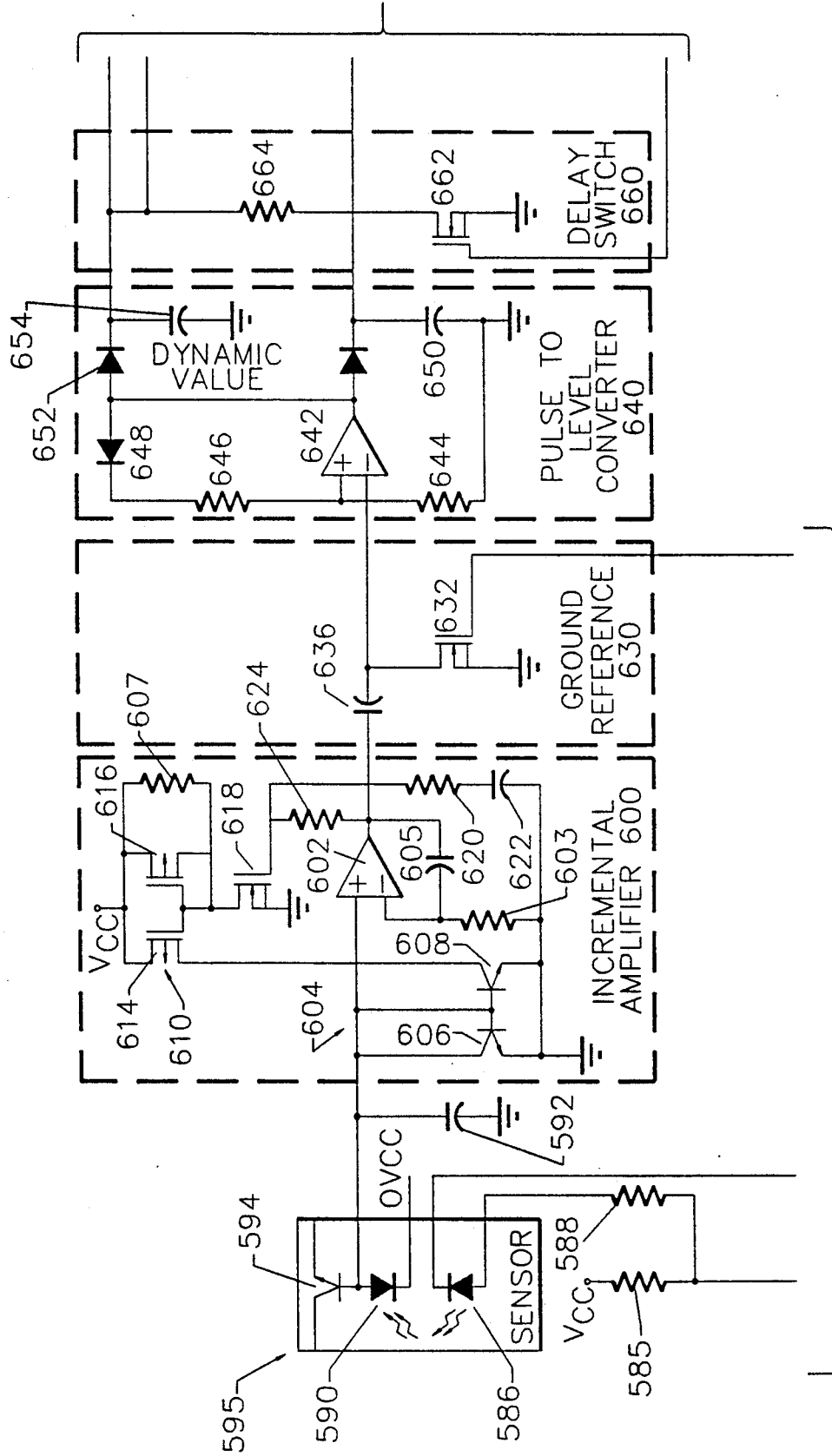

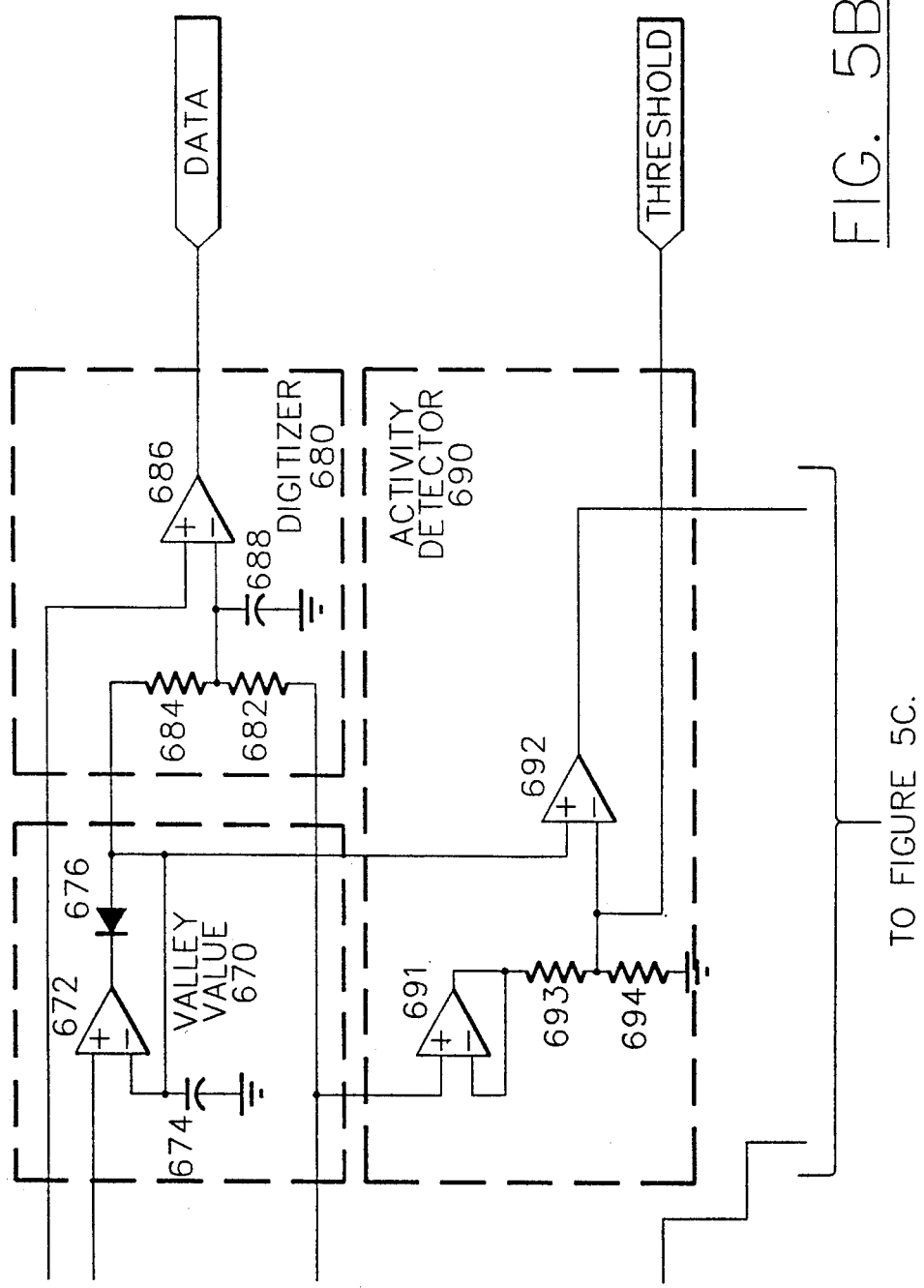

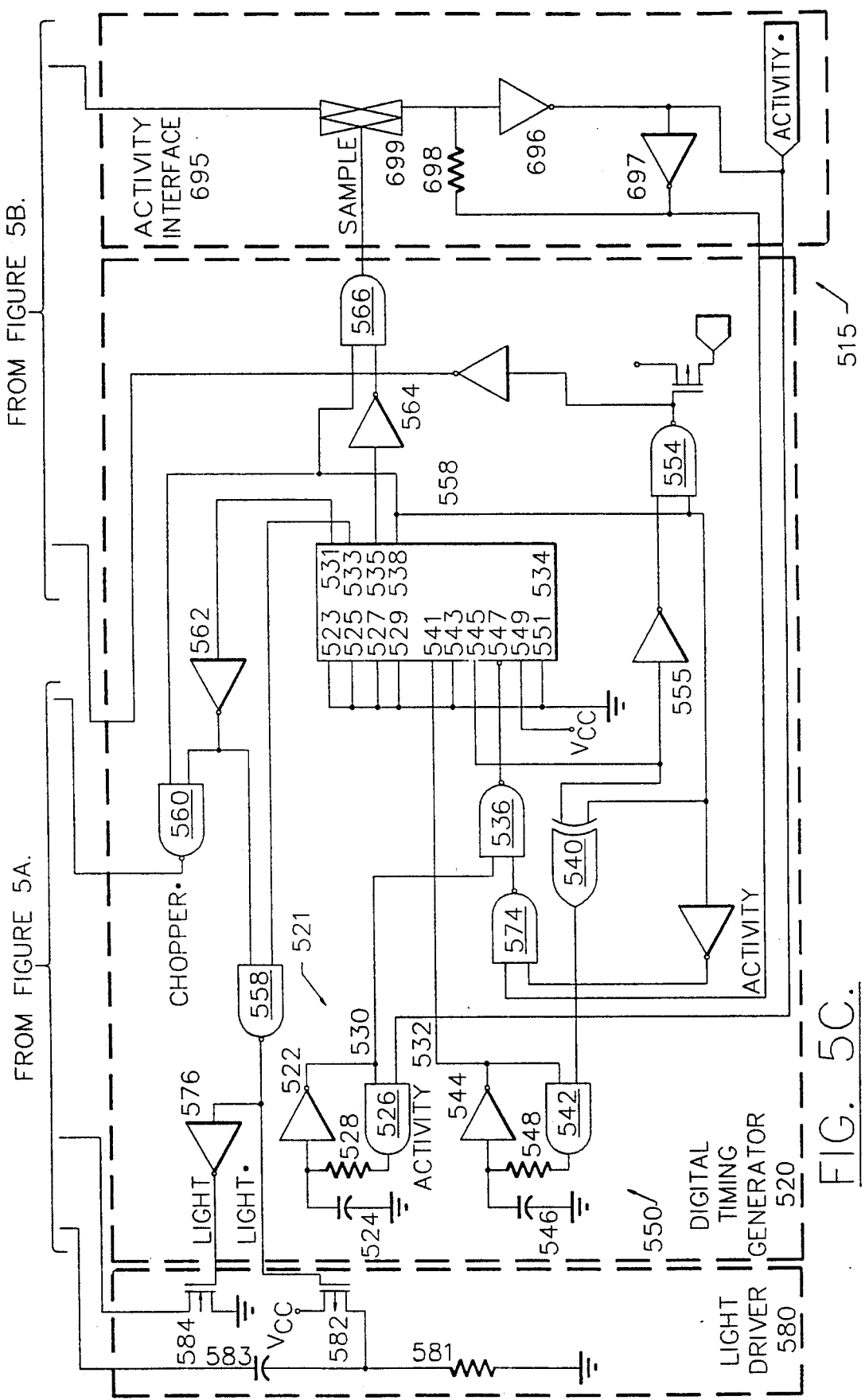

METHOD AND APPARATUS FOR LOW POWER OPTICAL SENSING AND DECODING OF DATA

FIELD OF THE INVENTION

This invention relates to optical character recognition systems, and more particularly to a method and apparatus for sensing and decoding data in an optical character recognition system.

BACKGROUND OF THE INVENTION

Systems for optically sensing and decoding data have been known for some time. Portable systems are also known for optically sensing and decoding data. See U.S. Pat. No. 3,509,353 entitled *Portable Record Reader* by Sundblad et al., U.S. Pat. No. 3,716,699 entitled *Method and Apparatus for Optical Code Reading* by Eckert, Jr. et al., U.S. Pat. No. 3,736,410 entitled *Hand Held Apparatus for Sensing Data Bits Carried on a Sheet* by Ragland et al., U.S. Pat. No. 3,748,483 entitled *Indicating Device for Use In Optical Sensing Equipment* by Englund et al., U.S. Pat. No. 3,925,639 entitled *Method and Apparatus for Reading Bar Coded Data Wherein a Light Source is Periodically Energized* by Hester, U.S. Pat. No. 4,072,859 entitled *Wand Turn-On Control* by McWaters, and U.S. Pat. No. 4,160,156 entitled Method and *Apparatus for Reading Bar Coded Data Wherein The Light Source Is Periodically Energized* by Sherer.

These portable units have been used for data collection in a broad range of operations, from inventory control in retail stores to the more recent use in the tracking of packages or cargo for shipment purposes. These portable optical reading units typically are battery powered or attached to a terminal unit which supplies a power source.

To increase the accuracy of such data collection systems, codes have been produced and printed on products or containers. One such code is a "bar code" which may be read by passing an optical sensing unit over the bar code on the product or by passing the product over the optical sensing unit. These bar codes are patterned in a unique way in order to specifically identify the product or container.

A bar code typically consists of a pattern of dark and light bars of varying widths with the encoded information determined by the sequence of these varying width bars. These bars are scanned by the optical sensing unit and the widths of the bars are then translated into a specific identifying sequence for that particular product.

Notwithstanding many improvements, two problems have limited the use of portable bar code units. The first problem is that a portable unit must be battery powered. The optical sensing unit typically requires a source of radiation to illuminate the bar coded data which typically places a significant drain on the battery. As the applications of these portable optical sensing units continue to expand, users of such units continue to demand lighter weight, lower cost, and extended usage time from these units. Hence, the amount of power used by the radiation source and the accompanying sensing and decoding circuits continues to be a major obstacle in expanding applications.

A second problem is that because the bar code itself is a pattern of dark and light bars, optically reading these bars is often difficult in high ambient conditions, such as direct sunlight. The high ambient light interferes with the radiation source used to illuminate the bar coded data. When the optical sensing unit is passed across the code, the ambient light causes signal recognition errors or problems for the sensing unit and the data is not correctly decoded.

Therefore, there is a continued need for a low powered optical sensing unit that also greatly reduces the reading errors in these high ambient conditions.

OBJECT AND SUMMARY OF THE INVENTION

It is therefore an object of the present invention to provide an improved method of sensing and decoding bar code data, and an apparatus for performing the same.

It is another object of the present invention to provide a method, and an apparatus, for sensing and decoding bar code data which substantially reduces the amount of power required to perform the sensing and decoding functions.

It is also an object of the present invention to provide a method, and an apparatus, which substantially reduces the sensing and decoding errors received in portable optical scanning systems when used in high ambient light conditions.

These and other objects are provided according to the present invention, by a method, and an apparatus, for low power and high ambient optical sensing and decoding of bar code data. The low power optical sensing and decoding method, and apparatus for performing the same, involves the manipulation of an input signal to an optical emitter, such as a light emitting diode ("LED"), or the output signal from an optical sensor, such as a photodiode, or both. The present invention may also be used with a precision optical reflective sensor such as the HEDS-1500 manufactured by Hewlett-Packard of Palo Alto, Calif.

In particular, the optical sensing and decoding circuit of the present invention has a digital timing generator for generating a high frequency carrier signal (for example 25 kHz) and a low frequency carrier signal (for example 40 Hz) which causes an LED to flash brightly and briefly one time per cycle. The system operates at one or the other carrier frequency, whichever is selected by the status of an activity line attached to the digital timing generator and an activity interface. The LED is flashed at low frequency until a bar code is placed in the optical path of the LED. Then, the LED is flashed at high frequency to capture the bar code information. Accordingly, low power is dissipated until a bar code is actually encountered, and high power operation only takes place during the bar code information capture stage.

After the LED is pulsed, the light from the LED is partially reflected internally and a small amount of this falls on an optical sensor. A larger portion of the light is focused on a plane external to the optical reader head. If a white surface is present at that position a portion of the light which reflects back will be captured by the same lensing system and focused on the sensor.

Differences between the amounts of light returning to the sensor during various cycles are interpreted as a measure of changes in the reflectivity of the surface at that location at that time or the absence of such reflectivity. Light from other sources such as the sun or artificial lighting contributes to the excitation of the sensor but is not synchronous and, therefore, may be distinguished in general by appropriate techniques. The light from outside the sensing system, e.g., sunlight or artificial room light, is referred to as ambient light. Accordingly, the sensing system is relatively immune to the effects of ambient light.

The effects of this ambient light are also reduced by an input circuit referred to as an incremental amplifier. These effects are further eliminated by a double balanced demodulator circuit which demodulates the bar code data signal by making use of the digital timing generator signal. The demodulated information consists of a pulse train in which the information is contained in the peak amplitude above a base level. These pulsed signals store the long term peak (on the order of one second) and the dynamic value, which is decayed a certain amount for each cycle time. This dynamic value is in turn used to maintain a long term minimum, or valley value. The long term peak and valley values are decayed toward one another by a tapped resistor whose tap is used as the reference for quantitizing the dynamic value into digital "ones" and "zeros" by a comparator.

These peak and valley values are then used to determine the activity state, via an activity detector circuit. When the activity state is "zero" the digital timing generator enters a lower frequency mode for energy conservation. When the activity state is "one" the read mode is in effect and the carrier frequency becomes the higher frequency, which provides the resolution required for bar code reading.

BRIEF DESCRIPTION OF THE DRAWINGS

Some of the objects and advantages of the present invention having been stated, others will be more fully understood from the detailed description that follows, and by reference to the accompanying drawings in which:

FIGS. 5A, 5B, and 5C schematically illustrate an overall block diagram of an optical sensing and decoding circuit according to the present invention.

DETAILED DESCRIPTION OF THE PREFERRED EMBODIMENT

The present invention now will be described more fully hereinafter with reference to the accompanying drawings in which a preferred embodiment of the invention is shown. This invention may, however, be embodied in many different forms and should not be construed as limited to the embodiment set forth herein; rather, this embodiment is provided so that this disclosure will be thorough and complete and will fully convey the scope of the invention to those skilled in the art. Like numbers refer to like elements throughout.

Figure 1:
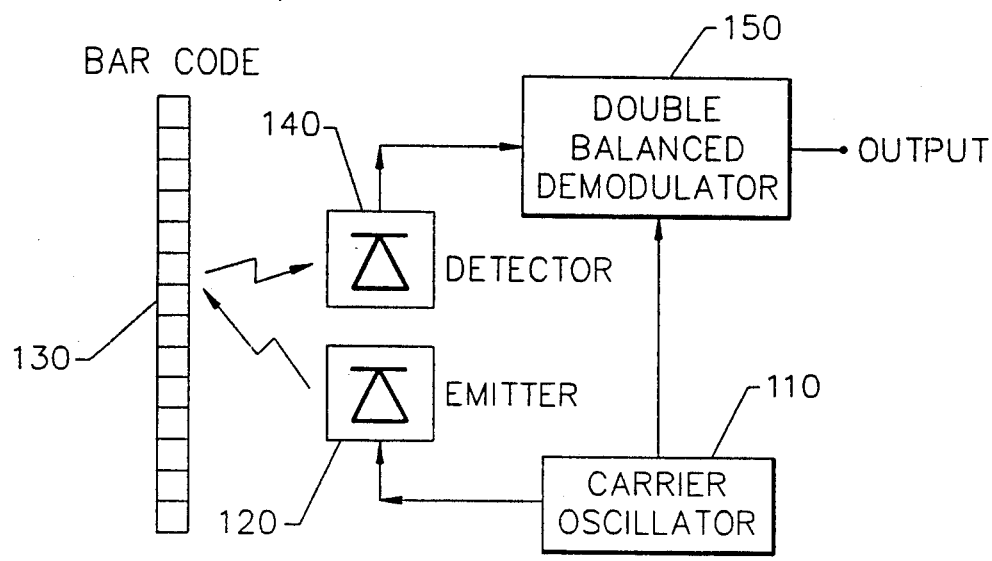
FIG. 1 schematically illustrates a block diagram of a doubled balanced demodulation circuit according to the present invention.

Now referring to FIG. 1, which schematically illustrates a block diagram of a double balanced demodulation circuit, a carrier oscillator 110 (note that a digital timing generator may also be used here) is used to provide an alternating current energizing signal for an emitter 120, such as an LED. The light from the emitter 120 is applied to the bar code 130 which, in turn, is reflected to a light detector 140. The resultant signal from the detector 140 and a signal from the carrier oscillator 110 together are then applied to a double balanced demodulator 150 in order to obtain an output signal which is immune to sunlight and fluorescent lights.

The carrier oscillator 110 produces rectangular or square waves, and the output of the detector 140 is converted into a sine wave using a circuit which is tuned to the carrier frequency. The rectangular or square wave carrier signal and the detected and converted sine wave signal are both applied to the double balance demodulator 150 to produce the output.

This aspect of the invention contrasts with detectors because the carrier signal is demodulator with the output of the detector 140. In other words conventional detectors use a single balanced demodulator (amplitude modulated ("AM") detector) to demodulate the detector signal without demodulating the detector signal and the carrier signal together.

The present invention has been shown to reject steady background lighting, reject 60 Hz or other background pulsing, offer good signal to noise ratio, and offer a wide dynamic range. This is accomplished by generating sidebands on the carrier signal by modulating the carrier signal with the variations of the bar code surface reflectivity. The carrier signal itself washes out as does sunlight (bias), and off carrier frequencies (60Hz, etc.). The modulation which is synchronous with the signal from the carrier oscillator 110, but carrying frequency components, is the only output component.

Figure 2:
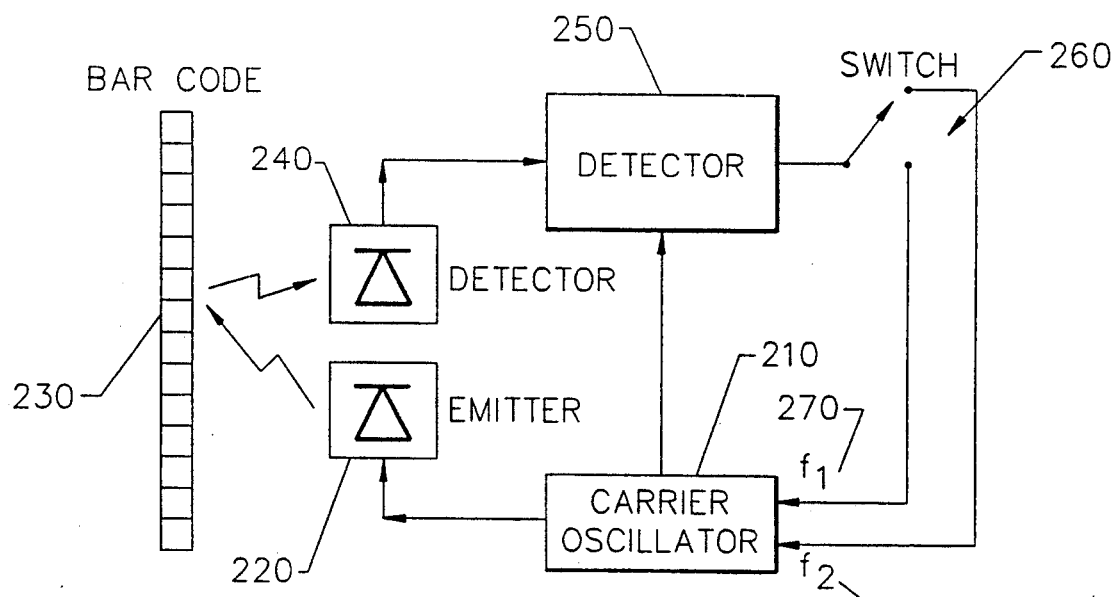
FIG. 2 schematically illustrates a block diagram of dual frequency energization of an optical emitter according to the present invention.

Referring now to FIG. 2, there is schematically illustrated a block diagram for a dual frequency energization of an optical emitter. The optical sensing and decoding apparatus of the invention provides a dual frequency energization technique for conserving power during bar code detection. The invention includes a carrier oscillator 210 (note that since the frequencies can be preselected a digital timing generator may also be used here) that operates at a low frequency (such as around 40 Hz) and a high frequency (such as around 200 Khz). According to the invention, when the detector 240 detects a very low level of reflectance, the switch 260 causes the carrier oscillator to produce a low carrier frequency (f1) 270. When a higher level of reflectance is detected, the carrier oscillator 210 is switched to a higher frequency (f2) 280 to thereby increase detection resolution.

Figure 3:
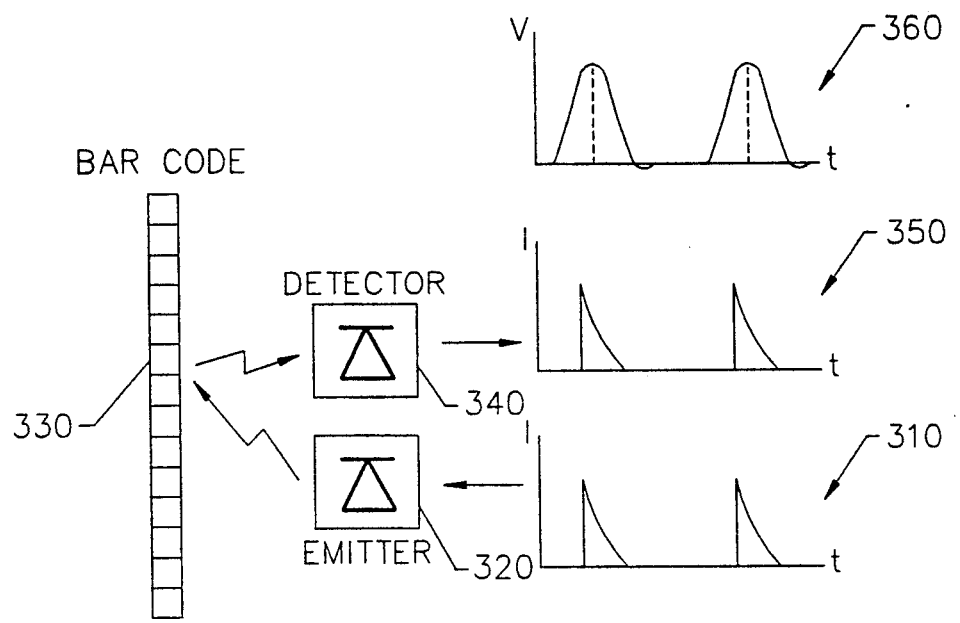
FIG. 3 schematically illustrates a block diagram of impulse energization of an optical emitter according to the present invention.

Referring now to FIG. 3, the block diagram schematically illustrates an impulse energization technique for an optical emitter. This impulse energization technique is used for either of the multistable vibrators 521 or 550 of FIG. 5 (see description below) or as a substitute for both. According to this technique, the LED emitter 320 is energized using high current, short-time-duration impulses 310, rather than being energized by rectangular waves, square waves or sine waves. The impulses 310 provide a current energization "jolt" to the emitter 320, which is high enough to overcome ambient sunlight. The impulse 310 decays rapidly to limit the total energy provided to the emitter 320 so that the emitter 320 is not damaged. Stated another way, the emitter 320 is sent a measured charge in a controlled waveform.

Conventional sine wave, rectangular or square wave energization stretches the energy applied to the emitter 320 over a longer period. By applying a large burst of current to the emitter 320, the invention provides a high burst of current to the detector 340 which, in turn, is easy to detect.

Figure 4:
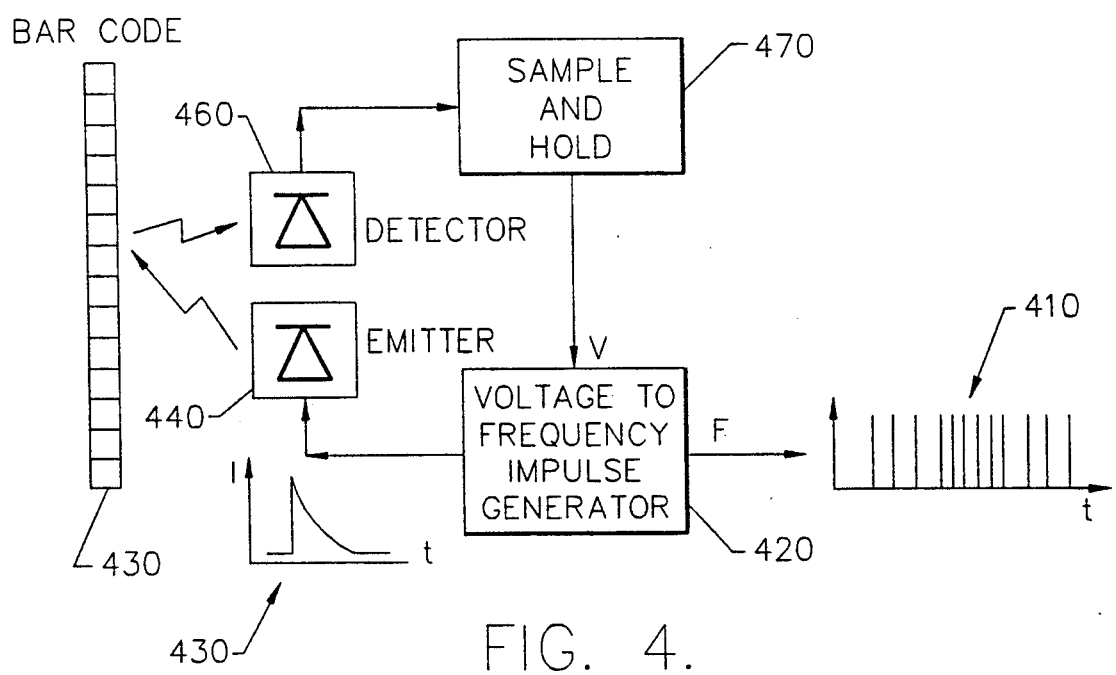
FIG. 4 schematically illustrates a block diagram of pulse counting detection according to the present invention.

Referring now to FIG. 4, bar codes 450 are detected by producing a frequency modulated ("FM") series of pulses 430. In other words, the pulse frequency provides an indication of the detected bar code. As shown in FIG. 4, a voltage to frequency impulse generator 420 generates impulses having a frequency which is proportional to the voltage (V) applied thereto. The output from the detector 460 is provided to a sample and hold circuit 470 which generates voltage (V). This voltage (V) is then fed back to and drives the voltage to frequency impulse generator 420. Accordingly, the frequency output (F) 410 of the voltage to frequency impulse generator 420 is a series of pulses having a frequency which is proportional to a function of the surface reflectivity of the last sample.

Optionally, a stretching circuit may be placed between the sample and hold circuit 470 and the voltage to frequency impulse generator 420 in order to stretch the duration of the sample, so that high resolution is obtained over the entire bar code by holding the sample rate high during the entire bar code. In another alternative embodiment, the output of the detector 460 may be quantitized and applied to a resetable digital integrator to produce a direct digital output. A digital implementation of the pulse counting circuit is thereby provided.

Without the stretcher circuit, the frequency output 410 provides surface data and the voltage output provides surface data. With the stretcher circuit, on the other hand, the voltage output provides high resolution over the entire label by holding the sample rate high during black bars. Any one or more of the above outputs may be implemented.

In this technique, frequency values are examined in order to decide whether the unit is sensing a black portion or a white portion of the bar code. A transimpedance amplifier, similar to that shown in block 600 of FIG. 5A, is used to match the sensor to the sample and hold requirements. In this aspect of the invention, the sample rate falls low when no surface reflectivity is detected. When the white leader of a tag is detected the rate responds very high because sample resolution is a function of reflectivity. Surface reflectivity digitization generates digital and/or analog records of surface reflectivity. It may have resolution control (such as to save current) and may also use charge pump current impulses. The output from the digitizer is a one (1) or a zero (0).

Each of the above described decoding techniques and systems may be implemented using components well known to those skilled in the art, and need not be described further. These techniques may be used individually or in combination. A preferred circuit implementation, which practices many of the above techniques, will now be described.

Referring now to FIGS. 5A-5C, there is shown a schematic illustration of an optical sensing and decoding apparatus 515. Block 520 diagrams the digital timing generator circuit of the present invention. All digital gates are powered by +5 Volts and all analog components receive $V_{cc}$ (common collector voltage) for the circuits of this embodiment of the invention. A gated free-running astable multivibrator 521 is formed by NOT gate 522, capacitor 524, AND gate 526, and resistor 528 thereby producing a timing signal 530. For this embodiment, 40 Hz was used as the timing signal frequency here. This multivibrator consumes about three (3) microamps when it is running.

The activity lines connected to AND gate 526 and NAND gate 574 from activity interface block 695, as best shown in FIG. 5C, either indicate a true activity by a high voltage level or a false activity (or non-activity) by a low voltage level when communicating with the gates 526, 574.

When the activity line 532 connected to AND gate 526 is false the timing signal 530 is enabled and toggles the shift data input of a four-bit shift register 534 through NAND gate 536. When the activity line 532 is true the output goes to true and enables the other input of gate 536 and the current consumption of the multivibrator 521 becomes negligible. The output of the shift register's fourth bit is shown at 538. The output of the fourth bit 538 and the input of the register 534 are presented to the inputs of exclusive OR gate 540, thereby defining an enable signal which is only true when the input differs from the signal which has shifted through to bit 538. Whenever the timing signal 530 reverses, gate 540 enables AND gate 542, which in conjunction with NOT gate 544, capacitor 546, and resistor 548 constitute a gated astable multivibrator 550 with an output timing signal 552; 200 kHz was used in this embodiment for the high frequency output 552. When enabled, output 552 initially remains true for about 3½ microseconds, switches to false for 2½ microseconds at which time its false to true transition clocks the shift register 534. After the initial 6 microsecond period, the frequency has a period of 5 microseconds (timing signal 552=200 kHz).

On the fourth false to true transition of output 552, the logic state of the input is clocked to the output thereby disabling the gated multivibrator 550 and maintaining its output in the true state where it remains until the next transition of the timing signal 530. The generation of output 552 consumes about 7 microamps during the 21 microseconds of operation and then drops to a negligible level for the balance of the 12,500 microseconds until the next generation of the timing signal 530. The purpose of gating output 552 off is to conserve power by not clocking the shift register 534 at the higher frequency (e.g., 200 kHz) during times when there is no activity to be recorded.

When the activity line 532 connected to AND gate 526 is true, the timing signal 530 goes directly to the true state and remains static. Simultaneously the inverse of the logic level of bit 538 is applied to the data input of the shift register 534 by gate 536. In this case, the inputs of the exclusive OR gate 540 are effectively sent across an inverted circuit. This enables output 552 to run constantly with bit 538 reversing its state every four complete cycles. In this case, the input and each output bit 531, 533, 535 and 538 will switch at 25 Khz with square waves of 20 microseconds true and 20 microseconds false. Also, each output bit is offset successively by 5 microseconds from the proceeding and succeeding stages of the shift register 534. The current for this stage will be about 30 microamps while it is oscillating.

In either of the above cases, a sequence of timing signals appears during the true going to false transition as it advances through the shift register 534. The sequence begins when a false level appears at the input to the shift register 534 from the output of gate 536. The combination of this false and the output bit 538 being true makes a false at the output of NAND gate 554 which will persist until the shift register 534 has shifted the false to the field effect transistor 662 in block 660. This period, which will nominally be 20 or 21 microseconds, is used to supply power to the operational amplifiers ("opamp") 642 and 672 in blocks 640 and 670 which typically require 400 microamps and 100 microamps respectively. The same period is used to discharge capacitor 654 through resistor 664 and transistor 662. The purpose of this is to drop the level of the dynamic value by several percent during each read cycle in which the sense pulse does not reach a sufficient level to set the charge on capacitor 654 through diode 652. This defines the maximum negative slope for the dynamic value and should be as great as is necessary to follow the input function during active read.

Under normal operation the stored voltage will begin to decay at the beginning of the sample cycle and will meet the rising pulse at some point and will follow it up to the peak, after which it will become fixed by the end of the period and transistor 662 ceases to conduct. If transistor 662 did not gate the period there would be a full discharge of capacitor 654 between sample cycles. The valley voltage would then be zero and, therefore, activity computation would be incorrect.

When the false is shifted to the output bit 531, the LED emitter 586 (shown in sensor unit 595 of FIG. 5 which combines an emitter 586 with a detector 590 and an output transistor 594) is enabled by the output of NAND gate 558 for a period of one cycle which is nominally 5 microseconds. Also, the chopper transistor 632 is turned off by the output of NAND gate 560. This allows the pulse to begin from a ground reference so that the light response may be measured at the output of an opamp 642. Transistor 632 remains non-conductive through the end of the sample cycle.

When the false is shifted to bit 535 an analog switch 699 (shown in block 695) transfers the output of the activity detector during the last 5 microseconds of the period into the Schmidt input memory element (invertor 696/invertor 697) of the activity interface in block 695. When the false is shifted to bit 538 the cycle is complete. Power down of opamp 642 and opamp 672 then occurs, bit 538 returns to the conductive condition to ground reference the input to opamp 642, transistor 662 becomes open to preserve the level on capacitor 654, and the input of the opamp 642 matches its output.

If the activity line is true this identity only lasts for three gate delays and the input becomes the inverse of the output. The output of the exclusive OR gate 540 has a sub-microsecond false spike and returns true, enabling the astable multivibrator 550 to continue running. If the activity line is false, the timing signal 530 is a square wave, of 40 Hz in this embodiment, and the transition is the cause of the pulse train which shifted the level through register 534. In this case, gate 542 will remain false and power is conserved until the next transition, which is from false to true, and no external actions result from it being clocked through register 534.

Now referring to block 580, a circuit diagram for a light driver is shown. Field effect transistors 582 and 584 are low impedance source and sink elements which are conductive for 5 microseconds of each sample cycle. They may be used individually or in voltage doubling setups. This or other similar circuits may be used to shape the output for the LED emitter 586 to have quick rise during the early part of a pulse time in the range of 5 microseconds. Various signal pulsing circuits, in turn, may also be used to produce timing for the light and logic sequences. During very low reflectance the light driver circuit 580 pulses the LED emitter 586 at a lower frequency which thus uses less current.

Again, referring to FIGS. 5A–5C, in block 600, the first level of signal conditioning is accomplished in the external slew control capacitor 592, outside the block 600, and the first analog stage. Block 600 schematically illustrates a circuit for an incremental amplifier 600 according to the present invention. The purpose of capacitor 592 is to reduce noise which is above the band of the useful information and out of the range in which the elements behave in the manner described herein. This applies primarily to the operational amplifier 602 whose slew rate is compromised by low current design for power considerations.

In use, the detector 590 senses a sharp burst of photons which it converts to carriers that cross the P-N junction rather randomly, but within a couple of microseconds. The total number of photons and consequently carriers is equal to the sum of the following three terms: (1) the internally reflected component of the beam from the light emitter 586 which consistently reaches the detector 590 from each pulse, (2) the ambient light which reaches the detector 590 but which did not originate from the light emitter 586, and (3) the light which leaves the read element and is reflected from the material reflectively off the label surface back to the detector 590; this component is the intelligence to be processed.

The total size of the signal is the combination of these plus environmental and interactive components. More particularly, these components include the sum of cross talk from electromagnetic, electrostatic and other constants of the structure whose timing is synchronous with the phase of the cycle timing, adds to the internally reflected photons term, and is eliminated in the same manner. These systematic factors appear to be quite harmless because of the method of elimination, but the range of validity is finite and they must be kept small for reliable operation. The leakage of the sensor is a small component which also enters into the equation and is effectively eliminated in the same manner as ambient light.

In practice, it is typically the material reflectivity of the label which is useful information and not the shine or glare components. To this end, it has been practical to maintain an angle of several degrees from the perpendicular, although it has not been previously reported to design the optics to be optimized for such an angle.. The use of polarized light to minimize the glare component has also not been reported in bar code readers.

From a circuit standpoint, it is generally difficult to read reliably when reflection predominates. This is seen as a data inversion on bright metal cans with white bars, when read normal to the surface rather than at a slight angle. The slew capacitor 592 is chosen to allow the information component to become integrated and shaped to produce a monotonic and amplitude related response through the amplifier.

The second structure encountered by the signal is the current mirror 604 formed by transistors 606 and 608. When a current is drawn from the collector/base of the transistor 606, it is done by moving the voltage on the base relative to the emitter until it is just sufficient to allow the current to pass from collector to emitter. This same voltage is on the base of transistor 608 since the two emitters are at a common node. This bias times the transconductance of transistor 608 allows a current to be sourced from the transistor 608. The current from the transistor 608 is related to the signal current by the ratio of the transconductances of the two devices which in practice is related by a constant quite close to one. The collector impedance of such a transistor at current levels, where the bulk resistance is not significant, is very high.

The second current mirror 610 and invertor structure 612, provided by field effect transistors 614, 616 and 618 establish a feedback means which eliminates the need for an extra power supply voltage. An opamp 602 has the collectors of 606 and 608 as its inverting and non-inverting inputs respectively. A current drawn from the transistor 606 lowers the voltage on the inverting input and raises the voltage on the non-inverting input. This has the effect of causing the output to move upward.

For short pulses (relative to the time constant of the value of resistor 620 multiplied by the value of capacitor 622), the rise is multiplied by the ratio of [resistor 620/{resistor 620+resistor 624}] and impressed on the gate of transistor 618. The increased bias causes an increase in the current through transistor 618 and a corresponding increase in the voltage on the inverting input of opamp 602. Assuming a high gain for opamp 602, the net effect is to pass the extra current from transistor 608 through transistor 614. The voltage increment on the gate of transistor 618 is the incremental voltage change on the output of opamp 602 times the ratio of [{resistor 620+resistor 624}/resistor 620].

Frequencies that are low compared to resistor 620 multiplied by capacitor 6222 are translated to a unity bias offset on capacitor 622 without the resistor ratio multiplier. In the case of the values used for this embodiment, resistor 644 (in block 640) multiplied by capacitor 622 is one millisecond compared to 16.7 millisecond for one cycle of 60 Hz. Thus, by using a very distorted carrier aspect ratio and a proper amplifier roll off, the gain for frequencies below 120 Hz is over 100 times less than for the information pulses.

In the ground reference circuit shown in block 630, the pulse occurs once in 40 microseconds. Transistor 632 is conductive to ground until the time of the light pulse at which time it becomes non-conductive for 15 microseconds. Thus, a 25 microsecond period is allowed for settling to ground reference before the next read pulse. The incremental amplifier circuit 600 remains on and active to some degree as long as the read function is in the active state or the inactive but alert state. The reason for this is to allow the voltage on capacitor 622 to stabilize and follow low frequency signals.

In summary, the input signal conditioning presents to the input of the pulse-to-level convertor circuit shown in block 640 a steady ground level until the time the light is flashed, and then allows 15 microseconds for the response to develop, followed again by ground level. The window opens at the time the light is flashed and 5 microseconds after power is applied to opamp 642 in the pulse-to-level convertor circuit 640.

Referring again to FIGS. 5A-5C, block 640 shows that opamp 642 receives the signal after ground referencing. Resistors 644 and 646 and diode 648 form a loop such that the output of opamp 642 will be at the voltage on its positive input times the ratio of [{resistor 644+resistor 646}/resistor 644] (which is 31 where resistor 644=3.3 kilo-Ohms and resistor 646 is 100 kilo-Ohms) plus one diode drop. The voltage on capacitor 650 will be raised whenever the output of opamp 642 minus one diode drop is greater than its present level. Thus, the voltage on capacitor 650 will regularly be pulled to a minimum level of 31 times the peak of the input of opamp 642. If this is less than the voltage already present there will be no effect. A current through capacitor 650 and capacitor 674 (in block 670) will slowly discharge capacitor 650 toward capacitor 674 as will be discussed after the derivation of the valley voltage.

Again, referring to block 640 of FIGS. 5A-5C the opamp 642 also drives a second diode 652 which charges capacitor 654 to a minimum of 31 times the voltage on its input in the same manner as was described for capacitor 650. The difference is that voltage decays away quickly during a fixed interval of each carrier cycle. The purpose of this loop is that during a period in which the successive peaks are decreasing, this decay over a full cycle period will allow the capacitor voltage to track downward with the rate of fall. During a stable period the peak will be charged in capacitor 654 during the latter half of the discharge period and peaking will be near the end. Therefore, capacitor 654 will not dip and will be left high until the next cycle.

Now referring to block 670, the non-inverting input of opamp 672 is attached to capacitor 654. The diode in the output loop of opamp 672 allows it to discharge capacitor 654 to the lowest voltage that occurs, but not to drive any current into capacitor 654. Pull up current is solely supplied by resistor 682 and resistor 684 (in block 680) from capacitor 650.

Referring to block 680, the center tap between capacitor 650 and capacitor 674 will remain stable as the two voltage levels decay toward each other as long as capacitor 650 and capacitor 674 are the same capacitance. This provides a center point between the highest and lowest voltages remembered at a time. The two will be alternatively updated as a bar code is read since the dark and white bars consecutively reach their respective maxima and minima. This reference is compared to the dynamic value to determine when to output a one or zero. Opamp 686 is used as a comparator and provides output levels for digital use in determining the significance of the label.

This circuit provides an analog to digital circuit (digitizer) for a low current reader. The output may be transmitted to a remote micropowered bar code sensor linked to data processing and/or storing element by a radio frequency ("RF") link. Accordingly, the analog transducer element function and data decoding functions take place, and information is forwarded in such a form as to allow it to be processed into a desired form in a remote device. This may also be performed by a small physical unit with enough power on board to allow for a practical amount of the power source to perform these functions.

The data processing and/or storing element may be of any convenient form consistent with the amount of volume required. Such form may resemble a pen or a ring or such other form as may be useful. In the alternative, a direct link via an electrical connection may also be employed for data processing purposes.

Referring now to block 690, the activity detector circuit 690 consists of a multiplier 691 and a comparator 692. The multiplier 691 outputs the peak voltage times a constant (0.9090909). The output of the multiplier 691 and the valley voltage are the inputs to a comparator 692. The comparator 692 outputs a one when the peak voltage exceeds the valley by ten percent (10%). This accomplishes two discriminations without requiring any fast amplifiers. Since peak and valley voltages become identical in the absence of activity, except for a small voltage which is determined by the timing of the discharge of the dynamic voltage and the circuit constants, the output of the comparator goes to logical zero in this case. Detected activity goes to one whenever the peak voltage becomes greater than the ratio of [(resistor 693+resistor 694)/resistor 694]times the valley voltages. This threshold point is independent of the gain of the amplifiers, the brightness of the LED emitter 586, the sensitivity of the photodetector 590, and the current going to the LED emitter 586 within the range of linear operation. Therefore, the activity function is dynamic and will function down to the quantitizing noise level and the amount of random light fluctuations with high frequency components which are not lost by the chopping reference at bit 538, in block 520.

This dynamic property makes the activity function become strongly related to the percentages of change in reflectance at the external focal point and, thus, dependent on the label being scanned. An external pin allows summing at the multiplier node which allows the threshold ratio to be adjusted when required.

Referring now to block 695, the activity interface samples the state of activity at the end of the read update sentence. If opamp 691 and opamp 692 are very low power, then the response may not develop until the next cycle time. The sample time is during the last 5 microseconds of the cycle when the analog switch 699 is enabled. The input Schmidt invertor 696 drives a standard invertor 697 which then loops back through a resistor 698 which forms a memory element. Cross talk through the analog switch could dither the output if the operation is at a minimum supply voltage, for example. The Schmidt input maintains digital stability under these conditions.

It is also well known to those skilled in the art to adapt or adjust various aspects of the bar code sensing and decoding apparatus herein disclosed to make the apparatus useful for multiple speeds, to create ultra sharp light pulses, to decrease blur, to sense paper, to signal and change resolution, to sense the rate of change of reflectance, to modify currently known AM frequency modulators, or to create an all digital quantitizer. The apparatus and method of the present invention may be used for these applications as well.

It is also known to those skilled in the art to fabricate integrated circuits and other analog and digital components incorporating or packaging various aspects of the present invention. The apparatus and method of the present invention may also be adapted and used for these variations as well.

The foregoing embodiment is to be considered illustrative rather than restrictive of the invention and the modifications that come within the meaning and range of equivalents of the claims are to be included therein. Although specific terms are employed in the drawings and specification, they are used in a generic and descriptive sense only and not for the purposes of limitation, the scope of the invention being set forth in the following claims.

That which is claimed is:

1. An optical data reader, comprising:
   optical emitting means for emitting optical radiation in an optical path to an optical data carrier;
   optical detecting means for detecting optical radiation emerging from the optical data carrier and for producing an electrical signal responsive thereto; and
   incremental amplifying means electrically connected to said optical detecting means for providing non-zero amplification of low frequencies and greater amplification of higher frequencies of the electrical signal responsive to the optical radiation detected by said optical detecting means.

2. The optical data reader according to claim 1, further comprising:
   timing signal generating means electrically connected to said optical emitting means for producing a timing signal at a predetermined frequency so that said optical emitting means emits optical radiation at the predetermined frequency responsive to said timing signal generating means; and
   double balanced demodulation means electrically connected to said incremental amplifying means and said timing signal generator for demodulating the electrical signal produced by said optical detecting means at the predetermined frequency produced by said timing signal generating means.

3. The optical data reader according to claim 2, wherein said timing signal generating means comprises oscillating means for producing a carrier signal at the predetermined frequency.

4. The optical data reader according to claim 2, wherein said timing signal generating means frequency is preselectable.

5. The optical data reader according to claim 1, further comprising:
   timing signal generating means electrically connected to said optical emitting means for producing a first timing signal at a first frequency and a second timing signal at a second frequency, and for controllably providing one of the first or second timing signals to said optical emitting means, so that said optical emitting means emits optical radiation at one of the first or second frequencies responsive to said timing signal generating means.

6. The optical data reader according to claim 5, further comprising:
   double balanced demodulation means electrically connected to said incremental amplifying means and said timing signal generating means for demodulating the electrical signal produced by said optical detector at one of the first or second frequencies produced by said timing signal generating means.

7. The optical data reader according to claim 5, further comprising:
   activity detection means electrically connected to said optical detector means and said timing signal generating means for detecting change in the electrical signal, and for controlling said timing signal generating means to generate the first or second frequency responsive to said activity detection means detecting the change in the electrical signal.

8. An optical data reader, comprising:
   timing signal generating means for producing first timing signals at a first frequency and second timing signals at a second frequency, the second timing signals being generated by selecting predetermined first timing signals;
   optical emitting means electrically connected to said timing signal generating means for emitting optical radiation responsive to said timing signal generating means and in an optical path to the optical data carrier at one of the first or second frequencies; and optical detecting means for detecting optical radiation emerging from the optical data carrier and for producing an electrical signal responsive thereto.

9. An optical data reader according to claim 8, further comprising:
double balanced demodulation means electrically connected to said optical emitting means and said timing signal generating means for demodulating the electrical signal produced by said optical detecting means at one of the first or second frequencies produced by said timing signal generating means.

10. The optical data reader according to claim 9, wherein said timing signal generating means frequency is preselectable.

11. The optical data reader according to claim 8 wherein said timing signal generating means comprises oscillating means for producing a carrier signal at one of said first or second frequencies.

12. The optical data reader according to claim 8, further comprising:
activity detection means electrically connected to said optical detector means and said timing signal generating means for detecting change in the electrical signal produced by said optical detector means, and for controlling said timing signal generating means to generate the first or second frequency responsive to said activity detection means detecting the change in the electrical signal.

13. A method of reading optical data, comprising the steps of:
generating a timing signal having a predetermined frequency;
emitting optical radiation responsive to the generating timing signal in an optical data path to an optical data carrier;
detecting optical radiation emerging from the optical data carrier;
producing an electrical signal responsive to the detected optical data; and
providing non-zero amplification of low frequencies and greater amplification of higher frequencies of the electrical signal.

14. The method of reading optical data according to claim 13, further comprising the step of:
double balanced demodulating the electrical signal responsive to detected surface reflectivity of optical radiation emerging from the optical data carrier and the predetermined frequency of the generated timing signal.

15. A method of reading optical data, comprising the steps of:
generating first timing signals having a first frequency;
generating second timing signals having a second frequency by selecting predetermined first timing signals;
emitting optical radiation responsive to the first or second generated timing signals in an optical data path to an optical data carrier;
detecting optical radiation emerging from an optical data carrier; and
producing an electrical signal responsive to detected optical radiation emerging from the optical data carrier.

16. A method of reading optical data according to claim 15, further comprising the step of:
double balanced demodulating the produced electrical signal responsive to one of the first or second frequencies of the generated timing signals.

17. The method of reading optical data according to claim 14, further comprising the steps of:
detecting change in the electrical signal; and
controlling the timing signal to generate one of the first or second timing signals in response to detecting the change in the electrical signal.

* * * * *

UNITED STATES PATENT AND TRADEMARK OFFICE
CERTIFICATE OF CORRECTION

PATENT NO. : 5,281,800

DATED : January 25, 1994

INVENTOR(S) : Walter E. Pelton; David L. Emery

It is certified that error appears in the above-identified patent and that said Letters Patent is hereby corrected as shown below:

On The Title Page, Item [57];
In the Abstract, second paragraph, line 2, "prising-the " should be -- prising the --.

Column 2, line 54, after "this" insert -- light --.

Column 4, line 15, after "with" insert -- known --.

Column 4, line 16, "demodulator" should be -- demodulated --.

Column 9, line 29, "6222" should be -- 622 --.

Signed and Sealed this

Thirty-first Day of May, 1994

Attest:

BRUCE LEHMAN

*Attesting Officer*  *Commissioner of Patents and Trademarks*